US009071497B2

(12) United States Patent
Kim et al.

(10) Patent No.: US 9,071,497 B2
(45) Date of Patent: Jun. 30, 2015

(54) APPARATUS AND METHOD FOR MODULATION CLASSIFICATION IN WIRELESS COMMUNICATION SYSTEM

(71) Applicant: ELECTRONICS AND TELECOMMUNICATIONS RESEARCH INSTITUTE, Daejeon (KR)

(72) Inventors: Chung Sup Kim, Daejeon (KR); Ki Cheol Tae, Daejeon (KR); Kanghee Kim, Daejeon (KR); Heung Yong Kang, Daejeon (KR); Soo-Ho Sohn, Daejeon (KR); Yong-Seok Choi, Daejeon (KR); Jae Ick Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 33 days.

(21) Appl. No.: 13/834,443

(22) Filed: Mar. 15, 2013

(65) Prior Publication Data
US 2014/0064402 A1    Mar. 6, 2014

(30) Foreign Application Priority Data

Sep. 6, 2012    (KR) .................. 10-2012-0098777

(51) Int. Cl.
*H04L 27/32* (2006.01)
*H04L 27/38* (2006.01)
(52) U.S. Cl.
CPC ..................... *H04L 27/38* (2013.01)

(58) Field of Classification Search
USPC .................. 375/322, 323, 329, 334
See application file for complete search history.

(56) References Cited

U.S. PATENT DOCUMENTS

| 6,934,342 | B1* | 8/2005 | Ishii et al. ............ 375/316 |
| 7,428,270 | B1 | 9/2008 | Dubuc et al. |
| 7,619,495 | B2 | 11/2009 | Albacete et al. |
| 2004/0136480 | A1* | 7/2004 | Smit .................. 375/350 |
| 2006/0269019 | A1* | 11/2006 | Simmons et al. ........... 375/343 |
| 2010/0316168 | A1* | 12/2010 | Ha et al. .................. 375/322 |

FOREIGN PATENT DOCUMENTS

KR    1020070000274 A    1/2007

OTHER PUBLICATIONS

Jae-Hyun Park, et al; "Epsilon Negative Zeroth-Order Resonator Antenna", IEEE Transactions on Antennas and Propagation, vol. 55, No. 12, Dec. 2007, pp. 3710-3712.
Isaias Zagoya-Mellado, et al; "Miniaturized Metamaterial Filters Using Ring Resonators", 2009 IEEE MTT-S International Microwave Workshop Series on Signal Integrity and High-Speed Interconnects (IMWS2009-R9), Guadalajara, Mexico, Feb. 19-20, 2009, pp. 45-48.

\* cited by examiner

*Primary Examiner* — Kevin Kim
(74) *Attorney, Agent, or Firm* — Ladas & Parry LLP

(57) ABSTRACT

An apparatus is used for modulation classification of unknown input signal in a wireless communication system. The apparatus includes a signal classification unit configured to classify the input signal into a PSK signal and an FSK signal and a modulation index decision unit configured to decide a modulation index for the PSK signal and the FSK signal classified by the signal classification unit.

9 Claims, 10 Drawing Sheets

82
ACF DATA

ACF DATA ogy in a radio communication system, and particularly, to an apparatus and method for classifying modulation schemes of target signals without knowledge of which modulation scheme is used, in a wireless communication system.

APPARATUS AND METHOD FOR MODULATION CLASSIFICATION IN WIRELESS COMMUNICATION SYSTEM

RELATED APPLICATION(S)

This application claims the benefit of Korean Patent Application No. 10-2012-0098777, filed on Sep. 6, 2012, which is hereby incorporated by reference as it fully set forth herein.

FIELD OF THE INVENTION

The present invention relates to signal modulation technology in a radio communication system, and particularly, to an apparatus and method for classifying modulation schemes of target signals without knowledge of which modulation scheme is used, in a wireless communication system.

BACKGROUND OF THE INVENTION

In a wireless communication system, it is the most important to accurately determine information on a received signal, for the purpose of utilizing a hostile communication area or cognitive radio (CR) technology instead of a communication method that sends predefined information.

In the techniques for automatic modulation recognition of an unknown signal, proposed have mostly been algorithms to extract characteristic of the unknown signal based on a baseband from which a carrier frequency has been removed. Therefore, it is important, to accurately find the carrier frequency of the unknown signal. In other words, automatic modulation recognition techniques have been developed on the assumption that some information favorable to the algorithms is fundamentally known in advance, and particularly, most of the techniques are implemented on the assumption that a carrier frequency is accurately restored. Thus, when a portion of the carrier frequency is remained in an actual environment, the performance of the automatic modulation techniques is degraded, and moreover, efficiency is reduced.

Moreover, generally, an automatic modulation classification technology in which the restoration of a carrier frequency is not performed classifies an unknown signal into a phase shift keying (PSK) class or a frequency shift keying (FSK) class according to the change in a signal level, restores a carrier frequency of the unknown signal, and then uses the modulation recognition techniques.

More specifically, the automatic modulation classification techniques uses information on a signal level and moreover uses a complicated scheme in which an algorithm, for deciding a modulation index "M" is conducted in a frequency domain. Due to this, a complicated and overlapping signal processing is needed to be performed for restoring an unknown signal in an actual environment in which a sampling rate of an automatic modulation recognition system is fixed.

SUMMARY OF THE INVENTION

In view of the above, the present invention provides an apparatus and method for modulation classification of an unknown input signal in a wireless communication, system, which decides a modulation index "M" by using a phase difference change race of the input signal and a slope of an auto-correlation function (ACF) for the input signal.

Further, the present invention provides an apparatus and method for modulation classification of an unknown input signal in a wireless communication system, which classifies the input signal into a PSK signal or an FSK signal within a signal-to-noise ratio (SNR) range of a receivable wide area in a wireless channel environment.

In accordance with a first aspect of the present invention, there is provided an apparatus for modulation classification of unknown input signal in a wireless communication system, which includes:

a signal classification unit configured to classify the input signal into a PSK signal and an FSK signal; and a modulation index decision unit configured to decide a modulation index for the PSK signal and the FSK signal classified by the signal classification unit.

Preferably, the signal classification unit classifies the input signal into the PSK signal and the FSK signal using a phase difference of the input signal.

Preferably, the signal classification unit sets a deviation between the signal characteristic of she PSK signal and signal characteristic of the FSK to greater than a predetermined deviation.

Preferably, the signal classification unit classifies the input signal into the PSK signal and the FSK signal in an SNR condition less than a predetermined value.

Preferably, the modulation index decision unit decides the modulation index in the classified PSK-class signal.

Preferably, the modulation index decision unit decides the modulation index by using characteristic of an ACF for the classified PSK-class signal.

Preferably, the modulation index decision unit compares a first slope of an ACF of the modulation index with a second slope of an ACF corresponding to a case in which the modulation index is 0, thereby deciding a final modulation index with respect to the input signal classified into the PSK signal.

In accordance with another aspect of the present invention, there is provided a method for modulation classification of unknown input signal in a wireless communication system, which includes:

classifying the input signal into a PSK signal and an FSK signal; and deciding a modulation index for the classified PSK signal and the classified FSK signal.

Preferably, the classifying the input signal comprises classifying the input signal info the PSK signal and the FSK signal using a phase difference of the input signal.

Preferably, the classifying the input signal comprises setting a deviation between the signal characteristic of the PSK signal and signal characteristic of the FSK signal to greater than a predetermined deviation.

Preferably, the classifying the input signal includes classifying the input signal into the PSK signal and the FSK signal in an SNR condition less than a predetermined value.

Preferably, the deciding a modulation index includes deciding the modulation index in the classified PSK signal.

Preferably, the deciding a modulation index includes deciding the modulation index by using characteristic of an ACF for the classified PSK-class signal.

Preferably, the deciding a modulation index includes:
calculating a first slope of an ACF of the modulation index;
comparing the first slope with a second slope of an ACF corresponding to a case in which the modulation index is 0; and
deciding a final modulation index according to the comparison result of the first and second slopes.

Preferably, fire deciding a final modulation index includes calculating a PSD of an ACF of the modulation, index.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Before a description of embodiments, the present invention is to implement technology that can decide a modulation index "M" by using a phase difference change rate of an input signal and a slope of an ACF of the input signal, and classify the input signal into a PSK signal or an FSK signal without any information on the input signal, within an SNR range of a receivable wide area in an actual wireless channel environment. On the basis of such a technical spirit, the objects of the present invention can be easily achieved.

Generally, since a main algorithm for automatic modulation is a characteristic extraction algorithm for a signal based on a baseband (from which a transmission frequency has been removed), it is important to accurately find the transmission frequency of the signal. A scheme of finding the transmission frequency may be distinguished between a PSK based on single-carrier transmission in which the transmission frequency information is not changed, and an FSK based on variant carrier transmission in which the transmission frequency is changed according to a transmission symbol. Further, the efficiencies of a transmission frequency restoration method differ a class basis, and thus, it is important to classify input signals into two classes. Generally, the PSK signal acquires a transmission frequency by using a frequency conversion scheme such as a fast Fourier transform (FFT), and the FSK signal decides a transmission frequency by using a phase difference or the number of passing through a zero point. A detailed description of the above may not be provided herein as well known in the art.

Hereinafter, embodiments of the present invention will be described in detail, with reference to the accompanying drawings.

Figure 1:
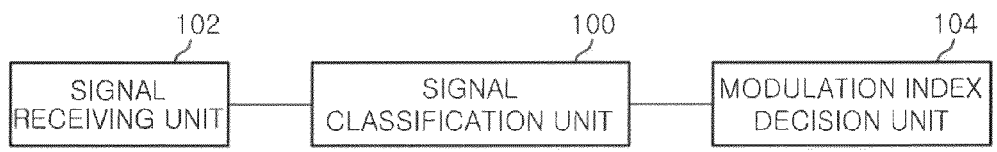
FIG. 1 illustrates a schematic block diagram of an apparatus and method for modulation classification of unknown signals in a wireless communication system in accordance with an embodiment of the present invention.

FIG. 1 illustrates a schematic block diagram of an apparatus for modulation classification of unknown signals in a wireless communication system in accordance with an embodiment of the present invention.

Referring to FIG. 1, an apparatus for modulation classification of unknown signals includes a signal receiving unit 104, a signal classification unit 100, and a modulation index decision unit 104.

The signal receiving unit 102 receives an arbitrary input signal transmitted thereto from a wireless transmission system, and supplies the input signal to the signal classification unit 100.

The signal classification unit 100 classifies the input signal supplied from the signal, receiving unit 102 into signals of two classes, for example, a PSK and an FSK. The classification of the input signal into the PSK and the FSK signals may be accomplished by using a phase difference of the input signal. In accordance with the embodiment, the input signal may be classified into the PSK signal and the FSK signal under the condition of a low SNR. In addition, by more increasing a deviation of PSK characteristic and FSK characteristic with a phase difference vector of the input signal, the classification of she PSK signal and the FSK signal can be easily facilitated.

The modulation index decision, unit 104 decides a modulation index "M" in the PSK signal and the FSK signal classified by the signal classification unit 100. For example, the modulation index decision unit 104 may decide a modulation index "M" in the PSK of the input, signal.

Figure 2:
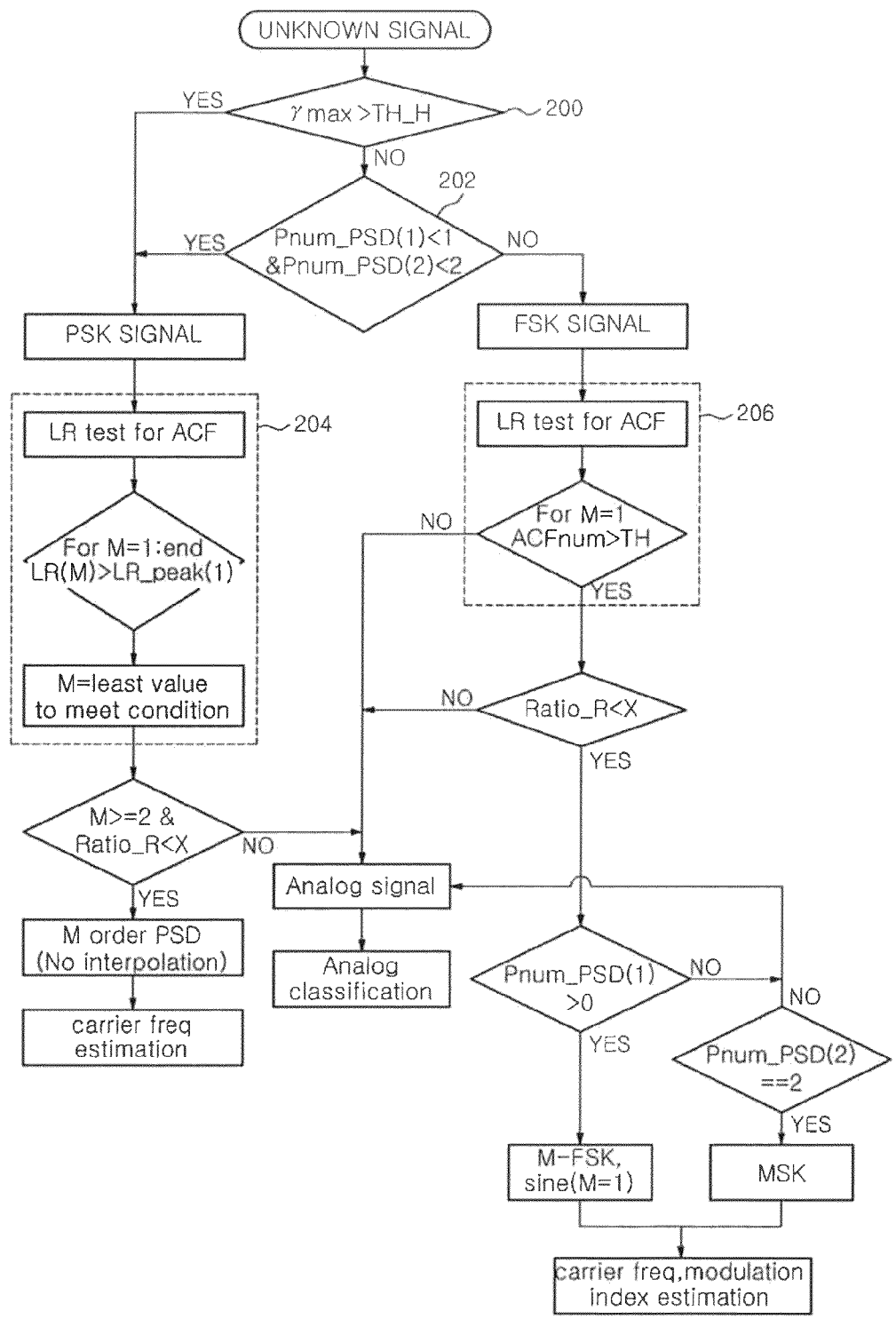
FIG. 2 is a flowchart describing a method for modulation classification of unknown signals in a wireless communication system in accordance with an embodiment of the present invention.

FIG. 2 is a flowchart illustrating a method that classifies a modulation scheme of an unknown input signal without restoring a transmission frequency of the input signal in accordance with an embodiment of the present invention, in which the input signal is classified into the PSK signal and the FSK signal and the modulation index "M" is decided for each of the classified classes. Also, FIG. 2 illustrates a method that simply classifies an analog signal and a digital signal.

First, operation 200 of FIG. 2 denotes a gamma max ($\gamma_{max}$) extraction algorithm that is used for classifying an unknown input signal into the PSK signal and the FSK signal. That is, an unknown input signal is classified into FSK signal when a value of $\gamma_{max}$ is greater than threshold TH_H; and if not, the unknown input signal is classified into FSK signal.

Unlike that the existing proposed algorithm classifies an input signal into a digital, signal and an analog signal having large level change by using a level vector, an embodiment of the present invention, as expressed in Equation 1, more increases a deviation between PSK characteristic and FSK characteristic using a phase difference vector of the input signal, thereby facilitating to classify the PSK signal and the FSK signal.

$$\gamma_{max} = \max \frac{|FFT(a_{cn})|^2}{N_s} \quad \text{Eq. 1}$$

where $$a_{cn} = \frac{|X|}{E[|X|]} - 1$$

$$X = \Delta[\text{unwrap}(\text{angle}(input_{vector}))]$$

where X denotes a phase difference vector of an input signal, and $a_{cn}$ denotes a normalized X.

Generally, it is known to those skilled in the art that a phase difference of a PSK signal may be changed in proportion to a sampling rate of the signal at a symbol change point, and a phase difference of an FSK signal may be changed in proportion to a symbol rate of the input signal at the symbol change point. In an embodiment of the present invention, based on the above fact, the input signal may be classified into the PSK signal and the FSK signal in accordance with characteristic in which a phase change rate of the PSK signal is greater than a frequency change rate of the FSK signal.

As expressed in Equation 1, a frequency domain conversion is performed on a phase difference vector, the characteristic of a time domain denotes size value information of a frequency channel, and thus, the PSK signal with a large phase-difference change has a value in phase-difference change greater than an analog speech signal and an FSK signal that have a relatively small phase-difference change.

Figure 3:
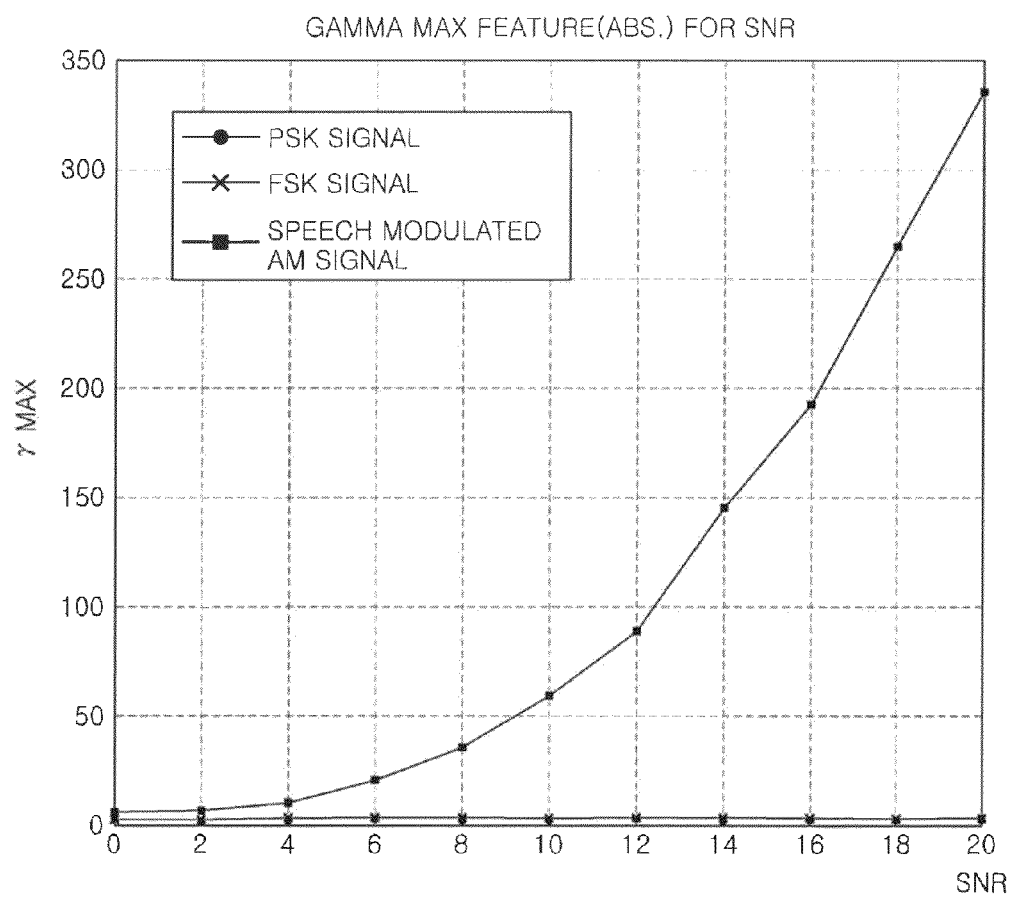
FIGS. 3, 4 and 5 are graphs showing comparison of simulation results between a conventional modulation classification technology and an inventive modulation classification technology.
Figure 4:
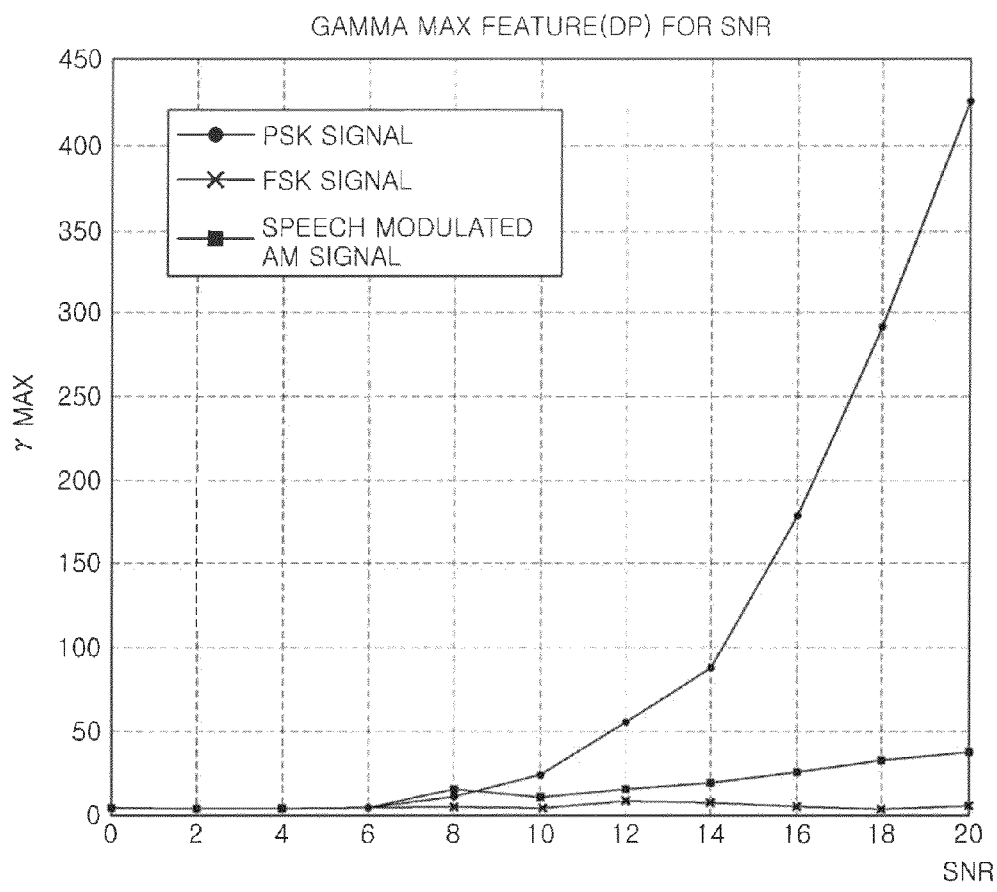
Figure 5:
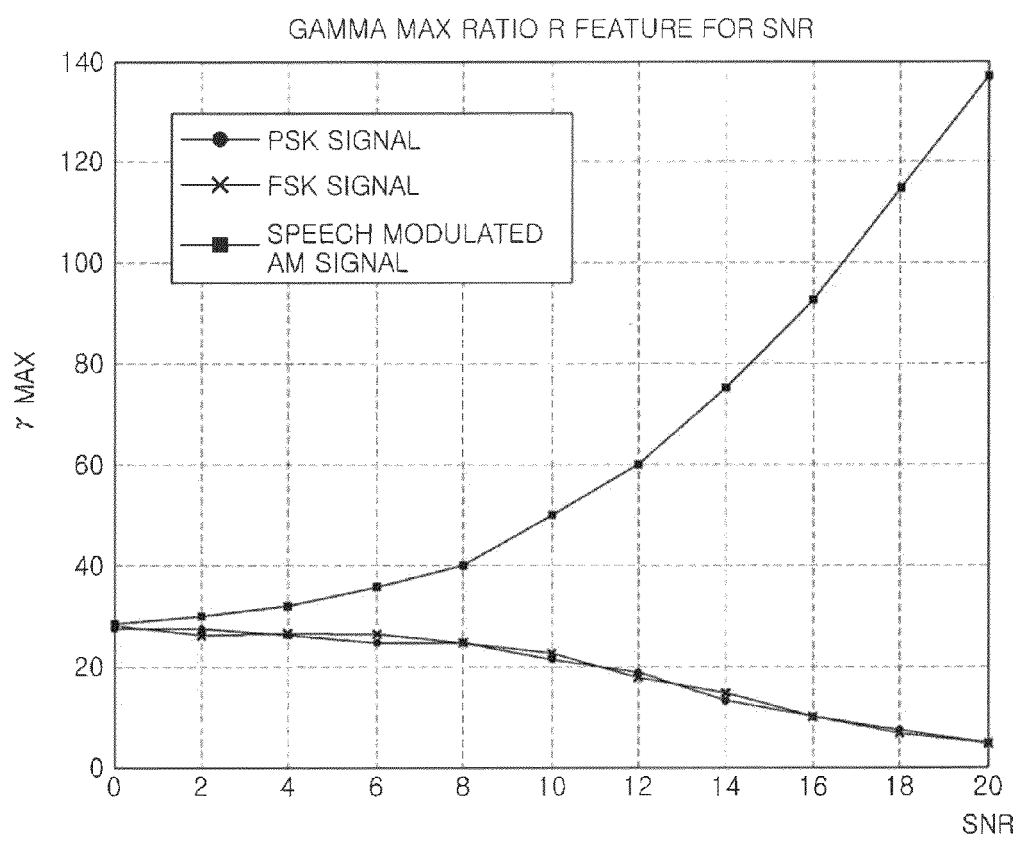

FIGS. 3, 4 and 5 are graphs showing comparison of a case using a conventional modulation classification technology and a case using an inventive modulation classification technology.

FIG. 3 is a result graph of a case in which a speech modulated AM (Amplitude Modulation) signal and a digital signal such as PSK and PSK signal are classified using the conventional modulation classification technology. As seen in FIG. 3, a PSK signal and an FSK signal are not classified, and an analog signal with a large amplitude change and a digital with a constant level may be only classified.

FIG. 4 is a result graph of a case that classifies a signal into the FSK signal and the PSK signal using the inventive modulation classification technology.

As shown in FIG. 4, the PSK signal and the FSK signal are efficiently classified, when an SKIP is 10 dB or more, and a $Ratio_R$ condition amplitude change test defined as the following Equation 2 may be used for clearly classifying the existing analog signal and the FSK signal.

$$Ratio_R = \frac{var(|input|)}{mean(|input|)^2} \quad \text{Eq. 2}$$

where var(|input|) denotes an average of an input signal and mean(|input|)$^2$ denotes a variance of an input signal.

A result of this is as shown in FIG. 5. As shown in the result graph of FIG. 5, it is expected that the accuracy of modulation classification can increase in the wireless communication system in accordance with an embodiment of the present invention.

The existing technology using a signal level vector can classify she FSK signal and the PSK signal on the assumption that, the PSK signal in filtering has a large level change. However, the existing technology has no effectiveness since it is unable to know how to use the PSK signal in an actual environment. Therefore, new technology for modulation classification is needed due to a difficulty to classify the PSK signal and the FSK signal.

There may occur a case in which the characteristic of the input signal is largely affected by noise since the valise of $\gamma_{max}$ decreases due to the decrease of the SNR, and thus, it becomes difficult to classify the PSK signal and the FSK signal. Operation 202 of FIG. 2 denotes a determination condition for the above case. In operation 202, a power spectral density (PSD) of an Autocorrelation Function (ACF) for the input signal is calculated and a PSD of an ACF for the input signal raised to the second power is calculated, and a classification is performed in accordance with a determination condition of operation 202. As a result, a classification accuracy of 90% or more may be secured even at an SNR of 6 dB (on a symbol rate basis).

Generally, in a case of a signal of PSK modulation scheme, a peak (point higher than an average noise level of 10 dB or more) is not extracted in a primary PSD result (PSD (1)), and one peak occurs in a 4PSK signal in the secondary PSD result (PSD (2)). On the other hand, in a case of a signal of the FSK modulation scheme, two multiples of a peak occurs in the primary PSD result, but, in a case of a minimum shift keying (MSK) signal, two peaks occur in the secondary PSD result. Such characteristics are used in the present invention. Here, calculated ACF data and PSD result may be reused in an operation of deciding a modulation index, and thus, the embodiment of the present invention may cope with a signal having a low SNR without overall increasing the number of calculations of an algorithm.

Operation 204 of FIG. 2 denotes an operation that decides a modulation index "M" for the input signal determined as the PSK signal.

As expressed in the following Equation 3, a slope of an ACF for the input signal is calculated with respect to the modulation index M under the assumed value of the modulation index, and the calculated slope of the ACF is compared, with a slope of the ACF corresponding to a case in which the modulation index is 0 (M=0), to thereby decide an actual modulation index "M".

$$LR_{slope_M} = |ACF(input^{2^M})|$$

$$M_{decision} = \min_M[LR_{slope_M} \geq LR_{slope_1}] \quad 3$$

where $LR_{slope_M}$ denotes a slope of autocorrelation values of an input signal with respect to an arbitrary PI, and $M_{decision}$ denotes a decision on sin actual modulation index.

Figure 6A:
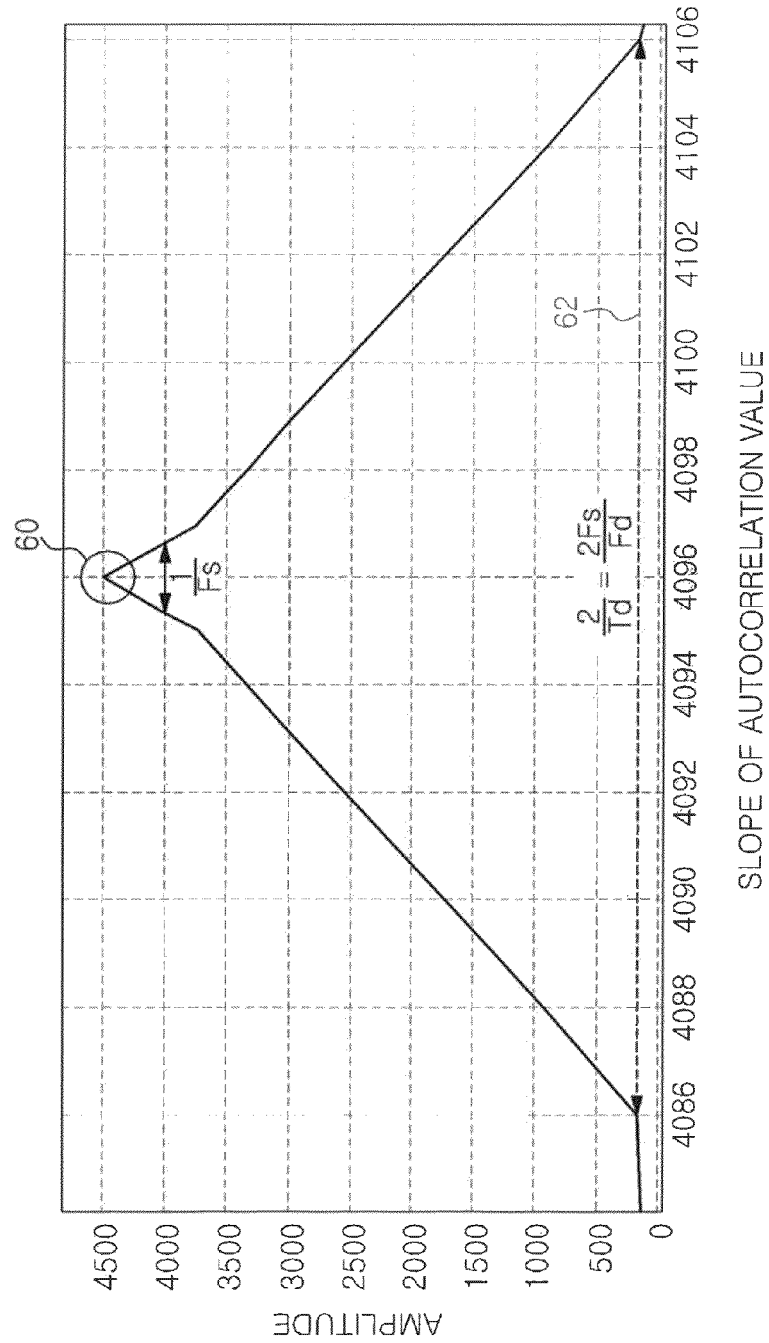
FIG. 6A illustrates a graph describing a characteristic of an ACF with respect to the signals determined as a PSK signal and having M=0.
Figure 6B:
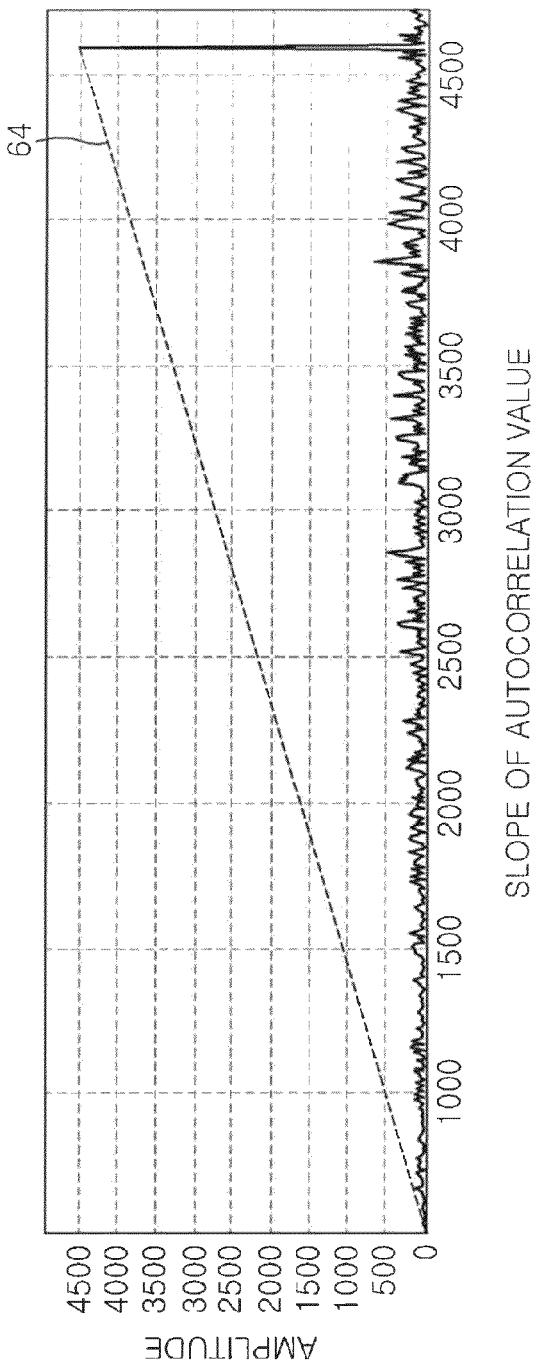
FIG. 6B illustrates a reference slope for deciding a modulation index "M"

FIG. 6A shows a graph describing the characteristic of the ACF for input signals determined as the PSK signal and having M=0. As shown, in FIG. 6A, a power having noise power, transmission frequency power (Fc (single sine wave power), and modulation-related power based on the modulation index "M" (M-th residual phase power) is generated at a middle point 60 in the graph. FIG. 6E shows that a slope 62, from a start point to a middle point, of the ACF in which M is 0 (M=0) is calculated, wherein the slope 62 is defined as a reference slope for deciding a modulation index. The slope value is used for a reference value for comparing with the slopes of the ACF for the increase in the modulation index "M".

As expressed in Equation 3, when a result of the ACF raised to the power of M according to the values of the modulation index "M" is matched with an actual modulation index "M", modulation-related power based on the modulation index "M" is depleted, and thus noise power and transmission frequency power in which a speed is higher by M times are only left. Therefore, a slope of an absolute value for the ACF entails unique linear component. The linear component is generated when only the modulation power is depleted, and thus, when a value is raised to the power of M to greater than the value of the actual modulation index "M", a linear component having a sharply increased slope is generated. In comparison with a reference slope (in which M is 0) using the linear component, a signal greater than the reference slope is determined as that a linear component is generated, and, the minimum M value meeting a condition of generating the linear component is selected, and the selected M is determined as an actual modulation index "M" of the input signal.

Equation 3 is an equation that calculates an ACF result for a population "M" (where M is an integer equal to or more than 0, and a range of M may be selected by a user), and the least M meeting a condition greater than the reference slope $LR_{slope_1}$ is decided as the final M.

The proposed method has a merit in which a sampling rate frequency of an actually generated, signal becomes relatively less than a symbol rate-related value when the signal is raised to the power of M using the fact that the restoration range of a transmission frequency generally has a value less than a symbol rate. Therefore, it is not required to perform a signal processing such as overlapping for artificially increasing a signal sampling rate. Further, the proposed method compares an ACF result raised to the power of M with a slope value of an input data size in which M is 0 (M=0) without using a frequency conversion scheme such as power spectrum to thereby decide an actual modulation index, which results in relatively reducing the amount of calculations. Also, when using a scheme that compares a detection envelope for decision with an ACF slope that is a signal in which M is 0 (M=0), the proposed method may be applied irrespective of the kind of a signal and the number of samples. Also, when estimating a power spectrum for the power of M with a calculated actual M value, one peak occurs, and a corresponding frequency may be determined as a transmission frequency of an input signal.

Figure 7A:
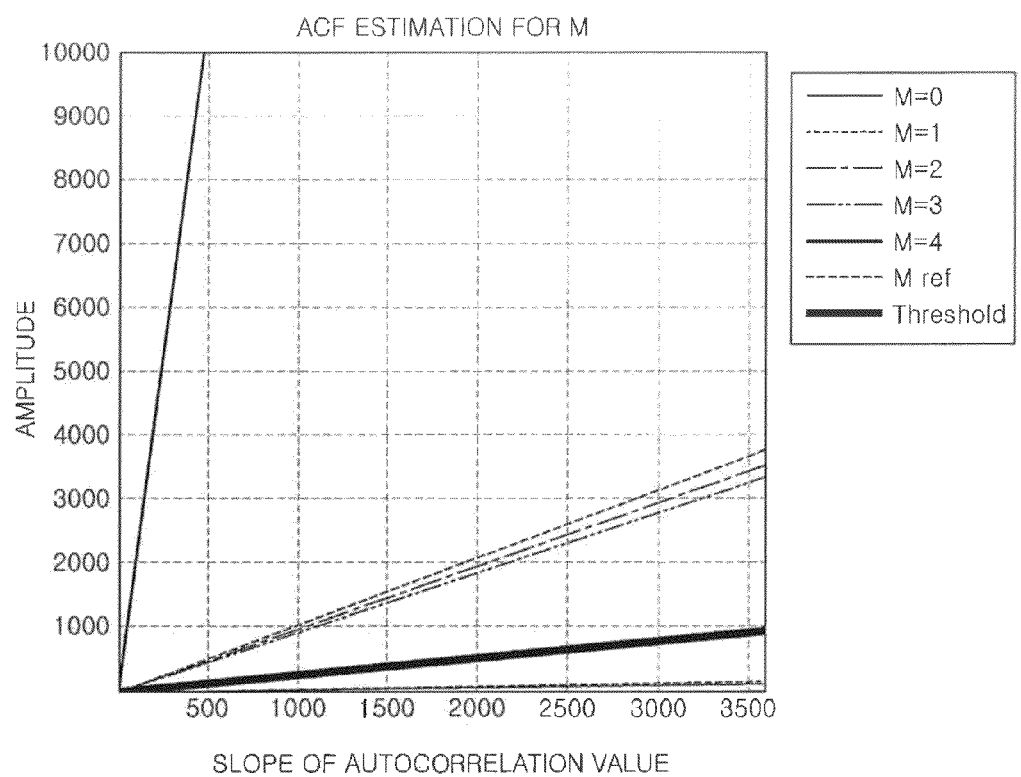
FIGS. 7A and 7B are graphs showing algorithm execution results for 4PSK and 16PSK, respectively, executed at an SNR of 10 dB.
Figure 7B:
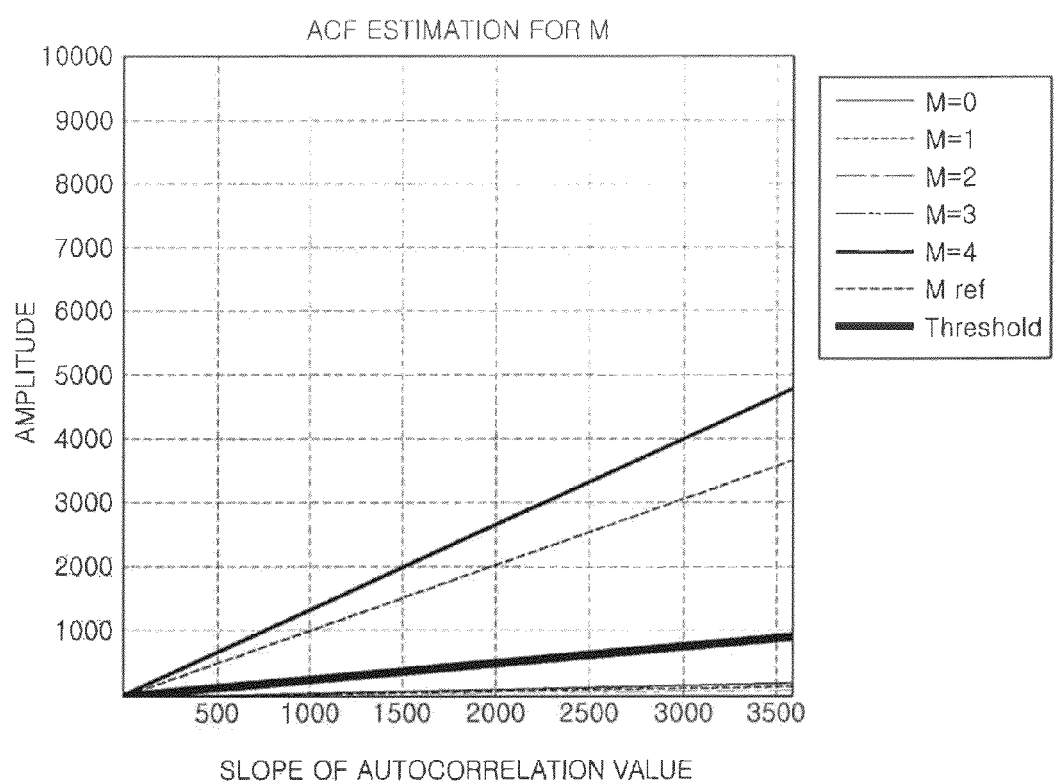

FIGS. 7A and 7B are graphs showing ACF estimation values with respect to M for 4PSK and 16PSK, respectively, executed at an SNR of 10 dB.

In a case of 4PSK as shown in FIG. 7A, since a slope of an ACF over M=2 is greater than an envelope of "Threshold", a modulation index "M" having the least value that meets a condition may be determined as 2. Therefore, when $2^M$ is calculated as expressed in Equation 3, an input signal is determined as a 4PSK signal because $2^M$ is 4.

Likewise, in a case of 16PSK as shown in FIG. 7B, what M is 4 (M=4) exceeds an envelope of "Threshold", an input signal is determined as a 16PSK signal because $2^M$ is 16.

Operation 206 of FIG. 2 is to separate an analog signal from the input signal determined as the FSK signal using the ACF characteristic of a digital FSK signal. That is, as expressed in Equation 4, in a case in which M is 0 (M=0), the reference slope calculated by the operation of operation 204 is compared with ACF absolute values. If the number of values greater than the reference slope is more than a certain number, the input signal may be determined as the FSK signal; and however, if not, the input signal may be determined as an analog signal.

$$LR_{slope_{ref}} = |ACF(input^{2^M})| \quad \text{Eq. 4}$$

$$ACF_{num} = \sum_{i=1}^{N} |ACF(i)| \le |LR_{slope_{ref}}|_{num}$$

$$Analog_{decision} = \text{if}(ACF_{num} < N_{th})$$

where $LR_{slope_{ref}}$ denotes a slope value when M=0.

Figure 8A:
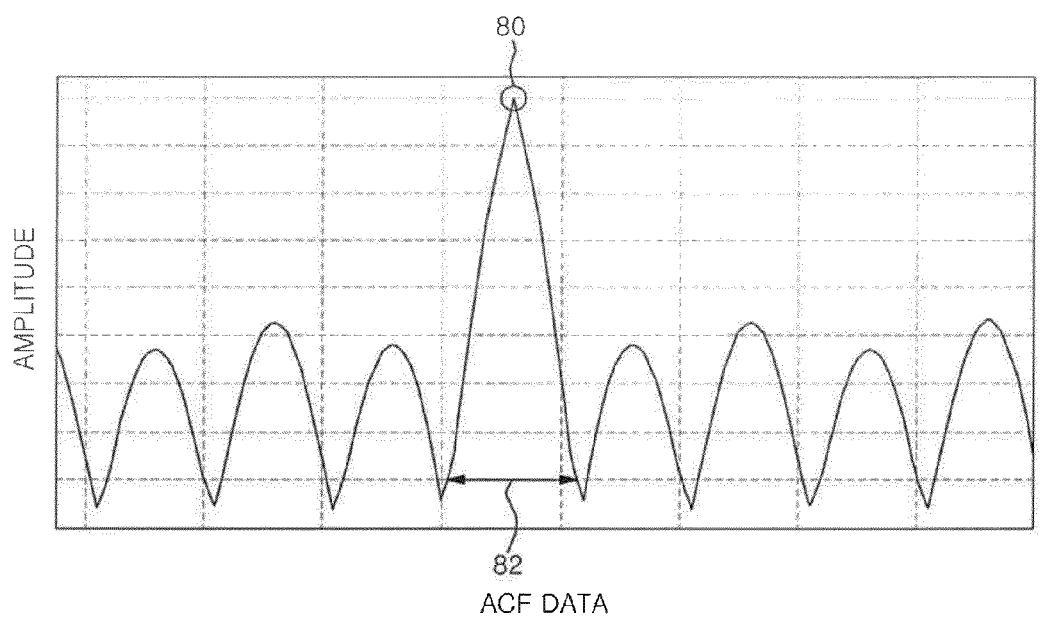
FIGS. 8A and 8B are graphs describing the characteristic and the absolute value of tin ACF of an FSK signal, respectively.

FIG. 8A shows a graph describing the characteristic of the ACF for the FSK signal. Similarly to the PSK signal as in FIG. 6A, there exist power based on noise power, transmission frequency power, and modulation power at the middle point of an ACF result. In FIG. 8A, a power having noise power, transmission frequency power (M-sine wave power), and modulation-related power based on the modulation index "M" (M-th residual phase power instant frequency) is generated at a middle point 80 in the graph.

Figure 8B:
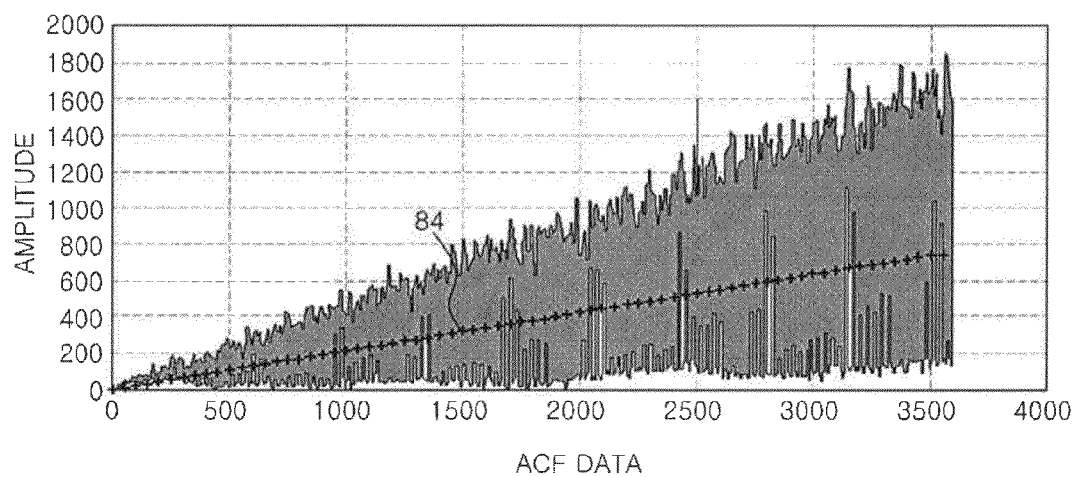

FIG. 8B shows a graph illustrating the change of the absolute value of the ACF due to the characteristic of the FSK signal. As shown in FIG. 8B, the FSK signal represents the characteristic different from a voice frequency modulation (FM) signal, and thus a digital FSK signal may be classified from an analog signal. In FIG. 5B, a reference numeral 84 denotes a slope for M=0.

In the decision of the modulation index for the digital. FSK signal that, has undergone operation 206, the number "$P_{num\_}$ PSD (1)" of the peaks of the primary PSD is decided as M by using the characteristics of the primary and secondary PSDs used in operation 202. In this case, when there is no peak in the primary PSD and the number "$P_{num\_}$ PSD (2)" of the peaks of the secondary PSD is 2, a signal may be decided as an MSK signal.

As described above, the present invention is to implement technology that can decide a modulation index "M" by using a phase difference change rate of a signal and a simple slope using an ACF of input data, and classify a signal into a PSK (signal carrier) class or an FSK (variant carrier) class without using any information (transmission frequency, etc.) on a transmission signal, within an SNR range of a receivable wide area in an actual wireless channel environment.

According to the present invention, since it is possible to determine a modulation scheme without estimating a transmission frequency, a classify signal processing operation for estimating a transmission frequency is not needed, and a modulation scheme can be determined using the ACF characteristic of an input signal for deciding a modulation index "M". Therefore, the present invention estimates a transmission frequency and moreover estimates a transmission scheme even without a priori information, on a transmission signal, in an actual wireless environment. Accordingly, the present invention enhances a recognition rate in various signal environments, and moreover, the enhanced result can be applied to various transmission recognition fields later.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An apparatus for modulation classification of unknown input signal in a wireless communication system, the apparatus comprising:
   a signal classification unit configured to classify the input signal into a PSK signal and an FSK signal; and
   a modulation index decision unit configured to decide a modulation index for the PSK signal and the FSK signal classified by the signal classification unit,
   wherein the signal classification unit classifies the input signal into the PSK signal and the FSK signal in an SNR condition less than a predetermined value,
   wherein the modulation index decision unit decides the modulation index in the classified PSK-class signal, and
   wherein the modulation index decision unit decides the modulation index by using characteristic of an ACF for the classified PSK-class signal.

2. The apparatus of claim 1, wherein the signal classification unit classifies the input signal into the PSK signal and the FSK signal using a phase difference of the input signal.

3. The apparatus of claim 2, wherein the signal classification unit sets a deviation between the signal characteristic of the PSK signal and signal characteristic of the FSK to greater than a predetermined deviation.

4. The apparatus of claim 1, wherein the modulation index decision unit compares a first slope of an ACF of the modulation index with a second slope of an ACF corresponding to a case in which the modulation index is 0, thereby deciding a final modulation index with respect to the input signal classified into the PSK signal.

5. A method for modulation classification of unknown input signal in a wireless communication system, the method comprising:

classifying the input signal into a PSK signal and an FSK signal; and deciding a modulation index for the classified PSK signal and the classified FSK signal, wherein said classifying the input signal includes classifying the input signal into the PSK signal and the FSK signal in an SNR condition less than a predetermined value, wherein said deciding a modulation index includes deciding the modulation index in the classified PSK signal, and wherein said deciding a modulation index includes deciding the modulation index by using characteristic of an ACF for the classified PSK-class signal.

6. The method of claim 5, wherein said classifying the input signal comprises classifying the input signal into the PSK signal and the FSK signal using a phase difference of the input signal.

7. The method of claim 5, wherein said classifying the input signal comprises setting a deviation between signal characteristic of the PSK signal and signal characteristic of the FSK signal to greater than a predetermined deviation.

8. The method of claim 5, wherein said deciding a modulation index includes:

calculating a first slope of an ACF of the modulation index;

comparing the first slope with a second slope of an ACF corresponding to a case in which the modulation index is 0; and deciding a final modulation index according to the comparison result of the first and second slopes.

9. The method of claim 8, wherein said deciding a final modulation index includes calculating a PSD of an ACF of the modulation index.

* * * * *